May 1, 1956 G. E. WILSON 2,743,750
FRUIT JUICER HAVING A CORING MEMBER AND ROTATABLE BLADES
Filed Aug. 7, 1953 3 Sheets-Sheet 3
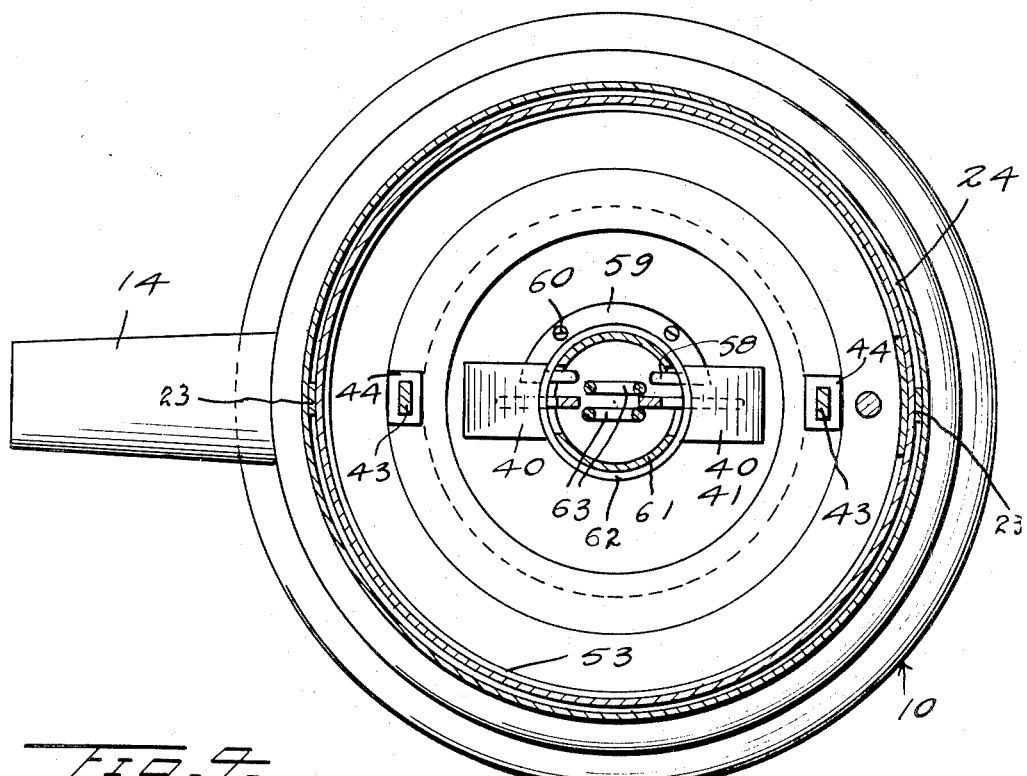
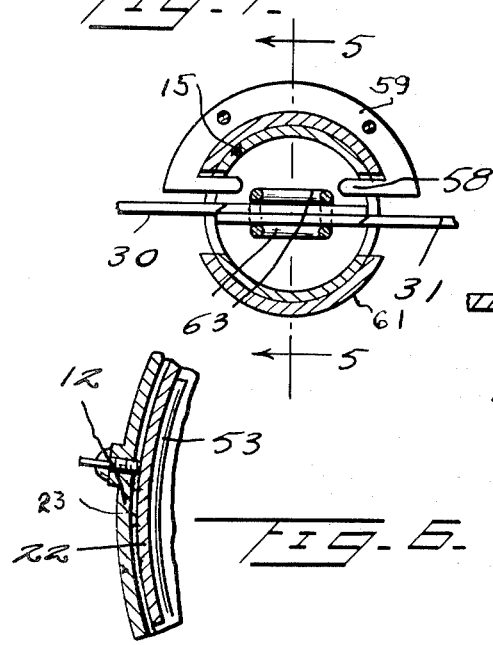
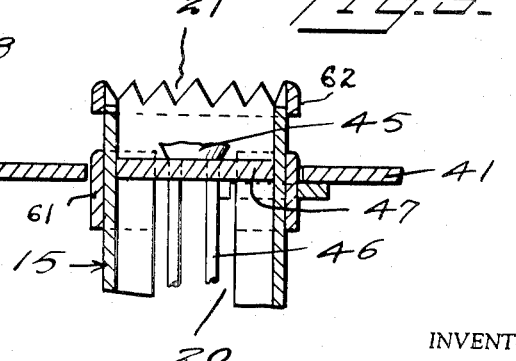
INVENTOR
G. E. Wilson
BY Kimmel & Crowell
ATTORNEYS U nited States Patent Office 2,743,750
Patented May 1, 1956

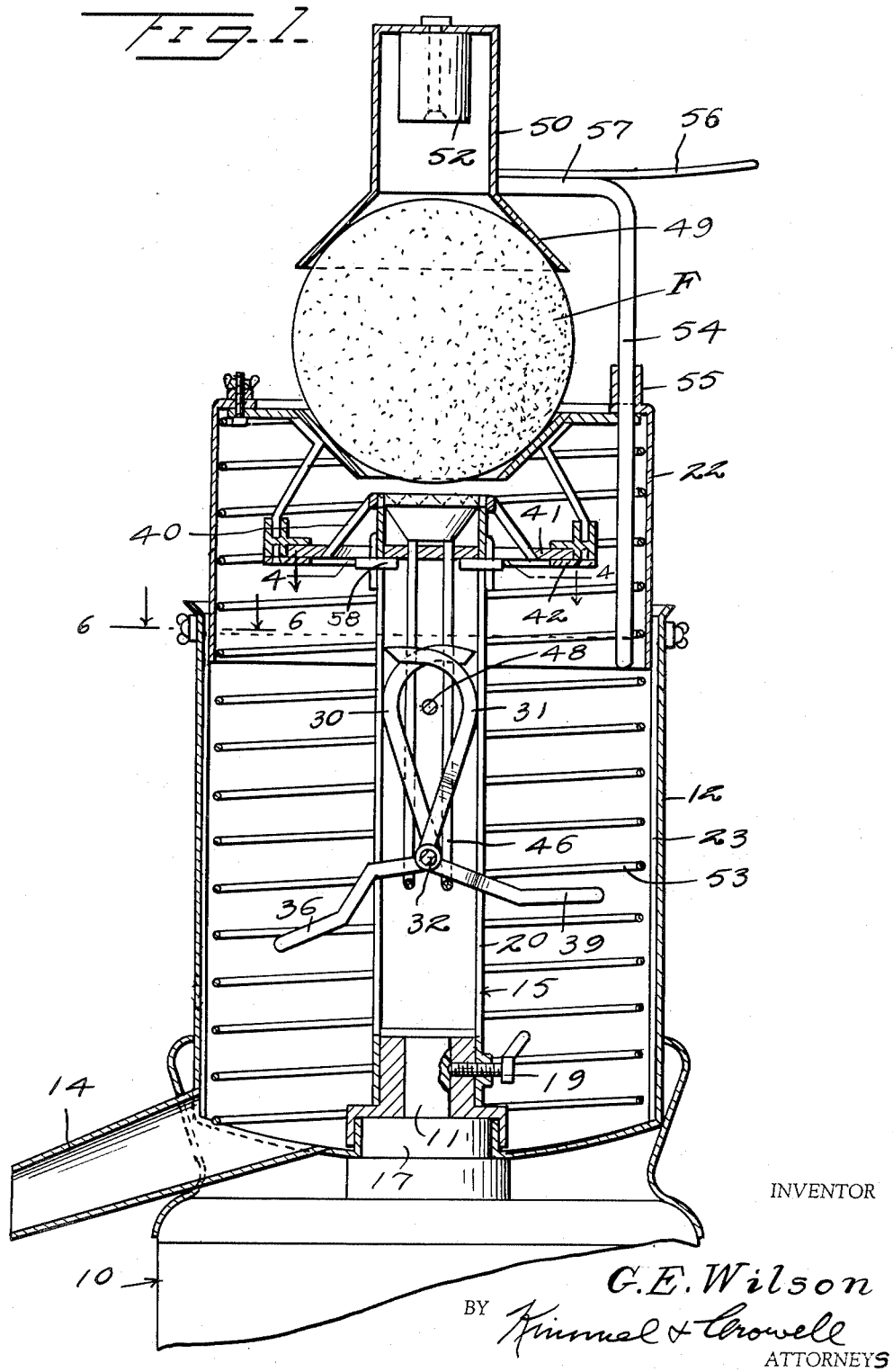

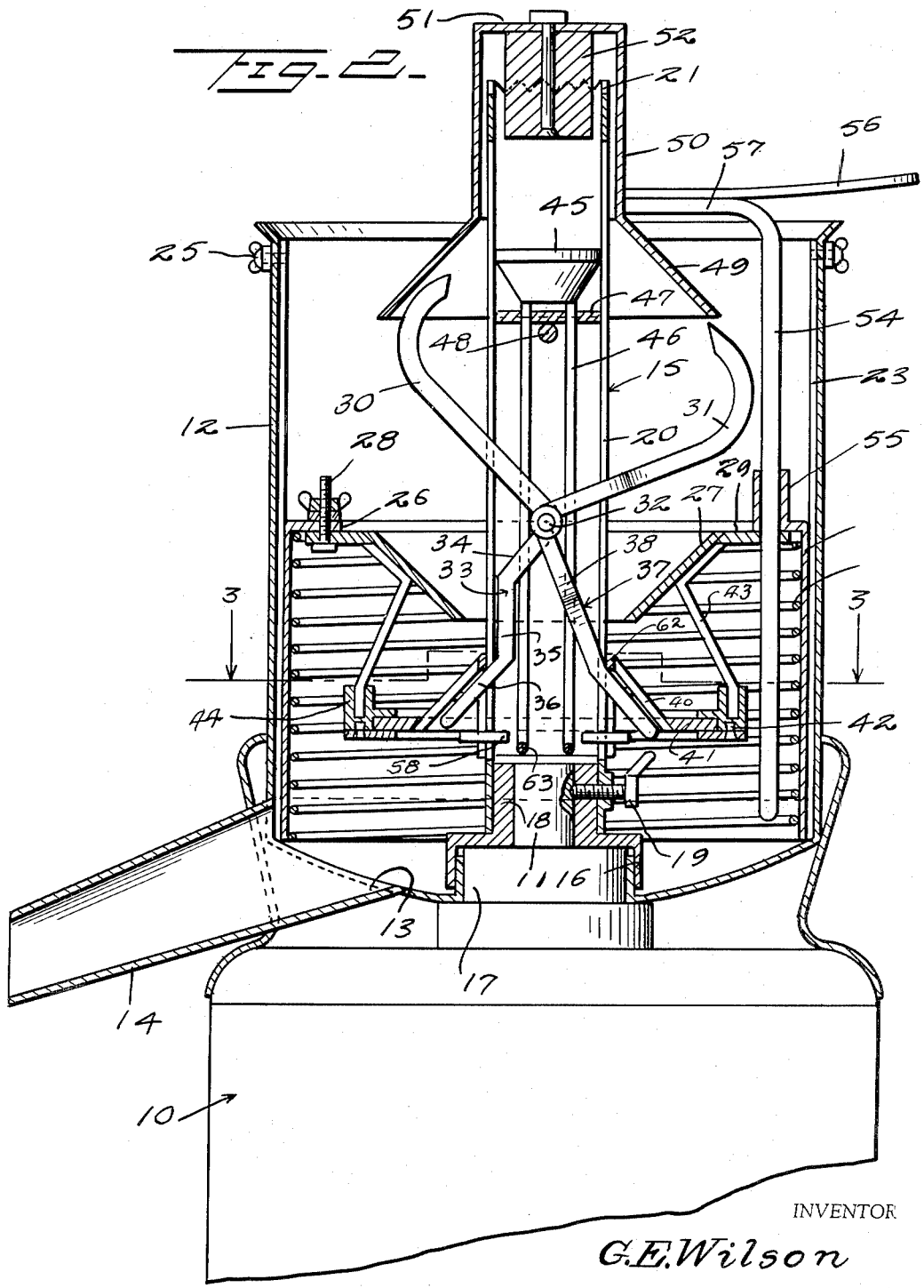

2,743,750

FRUIT JUICER HAVING A CORING MEMBER AND ROTATABLE BLADES

George E. Wilson, Fort Lauderdale, Fla., assignor to Wilson Juicer Corporation, Fort Lauderdale, Fla., a corporation of Florida Application August 7, 1953, Serial No. 372,880

1 Claim. (Cl. 146—3)

This invention relates to a fruit juicing machine.

An object of this invention is to provide a juicing machine for extracting the juice from citrus fruits which will readily extract substantially all of the juices from the fruit.

Another object of this invention is to provide a fruit juicing machine which will initially remove the core from the fruit, and after the fruit juice has been extracted the core will be returned to the fruit.

A further object of this invention is to provide a fruit juicing machine which is electrically operated, and is so constructed that it can be easily cleaned so that it can be maintained in a sanitary condition.

A further object of this invention is to provide a fruit juicing machine wherein the working parts thereof are lubricated by the extracted juices.

With the above and other object in view, my invention consists in the arrangement, combination and details of construction disclosed in the drawings and specification and then more particularly pointed out in the appended claim.

In the drawings:

Figure 1 is a vertical section partly broken away of a fruit juicer constructed according to an embodiment of this invention, in initial juicing position.

Figure 2 is a fragmentary vertical section on an enlarged scale showing the device in the completed stage of juicing.

Figure 3 is a sectional view taken on the line 3—3 of Figure 2.

Figure 4 is an enlarged fragmentary sectional view taken on the line 4—4 of Figure 1.

Figure 5 is a fragmentary sectional view taken on the line 5—5 of Figure 4.

Figure 6 is an enlarged fragmentary sectional view taken on the line 6—6 of Figure 1.

Referring to the drawings, the numeral 10 designates generally a base structure which has disposed therein, an electric motor (not shown).

A vertically disposed motor shaft 11 extends upwardly from the central portion of the base 10. A cylindrical housing 12 is fixed to and extends upwardly from the base 10 and the housing 12 is formed with an opening 13 in the lower portion thereof, with an outwardly and downwardly projecting spout 14 extending from the opening 13.

A vertically disposed tubular coring member, generally indicated at 15 is fixedly secured relative to the shaft 11. A cap 16 engages about a bearing 17 which is positioned about the shaft 11 and the cap 16 is formed with a bushing 18 engaging about the shaft 11. The lower end of the coring member 15 engages about the bushing 18 and bushing 18 with coring member 15 is fixedly secured relative to the shaft 11 by means of a set screw 19.

The coring member 15 is provided with a pair of diametrically disposed longitudinally extending slots 20 and the upper end of the coring member 15 is provided with teeth 21 for cutting into the fruit elements.

A vertically movable cylindrical slide member 22 is disposed within the housing 12 and is held against rotary movement in the housing 12 by means of a pair of vertically disposed flat bars or keys 23 which are fixed to the inner side of the housing 12.

The slide member 22 has fixed thereto, a pair of substantially semi-circular rings 24 which have their inner ends spaced apart and disposed in sliding engagement with the vertical edges of the key members 23.

A pair of set screws 25 extending through the upper portion of the housing 12 are adapted to engage the semicircular rings 24 so as to thereby limit the upward movement of the slide member 22. The slide member 22 is formed with an inwardly projecting annular flange 26 and a fruit seat member 27 of inverted truncated conical configuration is fixed by means of one or more bolts 28 to the flange 26.

The seat member 27 is formed with an outwardly projecting annular flange 29 bearing against the lower side of flange 26. A pair of longitudinally curved fruit juicing blades 30 and 31 are rockably mounted on a pivot 32 which extends across coring member 15 between the upper and lower ends thereof. Blade 30 has formed integral therewith, a blade rocking lever 33 which is formed with a substantially right angularly disposed inner arm 34, an obtusely disposed intermediate arm 35 and an outer arm 36.

Blade 31 has formed integral therewith, an operating lever generally indicated at 37, and lever 37 is formed with a relatively long arm 38 terminating in an obtusely disposed arm 39.

In the inoperative or initial position of the blades 30 and 31, these blades will be disposed within the coring member 15, as shown in Figure 1, and at this time, the levers 33 and 37 will be disposed in outwardly extending position. The blades 30 and 31 are adapted to be rocked outwardly to juicing position upon downward movement of the slide 22 by means of a pair of upwardly convergent bars 40 which are fixed to and extend upwardly from a disc-shaped plate 41.

The plate 41 is rotatably disposed in an annular channel member 42 which is fixed in depending relation below the seat member 27 by means of a pair of downwardly and outwardly extending supporting bars 43. The supporting bars 43 are fixed in outwardly projecting socket members 44 which are carried by the channel 42.

Upon downward movement of the slide 22, the levers 33 and 37 will engage the lever retracting members 40 and thereby move the blades 30 and 31 outwardly to juicing position. As shown in Figure 2, the intermediate lever portion 35 of lever 33 is substantially vertically disposed so that upon downward movement of slide 22, lever 30 will be held in a predetermined outwardly projecting position, whereas, blade 31 will be rocked outwardly throughout the downward movement of slide member 22.

A core holding plunger 45 is loosely disposed within the coring member 15 and has depending therefrom, a pair of U-shaped bars 46. The bars 46 are disposed on opposite sides of the levers 33 and 37 and the inner portions of the blades 30 and 31. A plate 47 is fixed to the upper portions of the bars 46 and is adapted at the lowermost position of plunger 45 to engage a transversely disposed stop pin 48 carried by the plunger 45.

An upper substantially conical cap member 49 is adapted to engage over the top of the fruit F and the cap member 49 has extending upwardly therefrom, a cylindrical housing 50 having a top wall 51. The plunger 45 in the lowermost position of the cap 49 is adapted to engage interiorly of cylindrical member 50 and about a plug 52 which is fixed to the top wall 51.

The core removed by the coring member 45 is adapted to be engaged between the plunger 45 and the plug 52 and to be compressed therebetween so as to remove any juices which are within the core. At the time the slide member 22 and cap 49 are in the lowermost position as indicated in Figure 2, the core which has been cut out of the center of the fruit F will be disposed within the upper portion of core member 15 and between plunger 45 and plug 52.

Slide member 22 is constantly urged upwardly by means of a spiral spring 53 engaging within slide member 22 and within the housing 12. Cap member 49 has fixed thereto, an L-shaped slide bar 54 which slidably engages through a guide 55 carried by the flange 26. A handle 56 is fixed to the upper horizontal side 57 of L-shaped member 54 and provides a means whereby cap 49 with slide 22 and an article of fruit F, may be moved downwardly to a juice extracting position.

Plunger 45 is raised upwardly from the lowermost position shown in Figure 2 to a position substantially flush with the upper end of coring member 15 by means of a pair of inwardly projecting fingers 58 which are carried by an arcuate plate 59 secured by fastening members 60 to the lower side of plate 41.

The fingers 58 extend loosely through the slots 20 and are adapted upon upward movement of slide member 22 to strike plate 47 and thereby raise plunger 45 to the upper end of coring member 15 so as to thereby replace the initially removed core within the center of the now juiced fruit F.

Plate 41 has fixed thereto, a pair of elongated guide bushings 51 which loosely engage about the coring member 15. The upper inner ends of the lever operating member 40 are fixed to a ring 62 which loosely engages about the coring member 15.

In the use and operation of this device, the slide member 22 is initially disposed in the position shown in Figure 1, wherein a substantial portion of slide member 22 is extended above housing 12. Cap member 49 is raised upwardly to dispose an article of fruit F on seat 27 and within cap 49. With shaft 11 rotating, coring member 15 will rotate therewith and at the same time, blades 30 and 31 with associated elements will rotate coring member 15.

During the initial downward movement of slide 22, coring member 15 will cut out the core which will be disposed between plunger 45 and plug 52. When lever operating bars 40 contact with levers 33 and 37, blades 30 and 31 will be swung outwardly through the hole formed by the removal of the core and as slide member 22 is depressed downwardly to its lowermost position, blades 30 and 31 will be swung outwardly, and as these blades are rotating with coring member 15, the juice within shell of the fruit will be removed and will flow downwardly through the bore formed by removal of the core and the extracted juice will drop downwardly into the housing 12 and will be drained from housing 12 by the spout 14.

After the juice has been extracted from the fruit, slide member 22 is released for upward movement under the tension of spring 53. The juice extracting blades 30 and 31 are retracted into the coring member 15 by means of the bight members 63 of the bars 46 which engage the inner edges of the levers 33 and 37.

During the last portion of the upward movement of slide member 22, plunger 45 is moved upwardly a short distance by upward movement of the plunger raising fingers 58 so that the removed core will be redeposited into the interior of the now juiced fruit.

What is claimed is:

A fruit juicing machine comprising a base, a power member in said base having a vertical shaft, an upright cylindrical housing carried by said base, a tubular coring member fixed to said shaft coaxial of said housing, said coring member having a pair of diametrically disposed longitudinal openings, a cylindrical slide member telescoping in said housing, a pair of juice extracting blades rockably carried by said coring member, a blade operating lever carried by each blade and extending outwardly of an opening, a lower fruit seat fixed to said slide member, an upper fruit seat, means slidably supporting said upper seat on said slide member for vertical movement relative to the latter, a lever rocking means loosely engaging about said coring member, means dependingly and rotatably supporting said lever rocking means from said slide member, means for rotating said lever rocking means with said coring member, a core supporting plunger loose in said coring member, means dependingly carried by said plunger engageable with the inner portions of said levers for rocking said levers outwardly to blade retracting position upon upward movement of said slide member, means for moving said plunger upwardly with upward movement of said slide member, resilient means constantly biasing said housing and said slide member for movement away from each other, and a juice delivery spout carried by said housing.

References Cited in the file of this patent
UNITED STATES PATENTS

| | | |
|---|---|---|
| 1,994,114 | Somers | Mar. 12, 1935 |
| 2,243,025 | Wilson | May 20, 1941 |
| 2,475,559 | Wilson | July 5, 1949 |